Feb. 6, 1951   G. W. OVERTON ET AL   2,540,906
ARTIFICIAL CHAMOIS SKIN AND METHOD OF MAKING THE SAME
Filed June 5, 1947
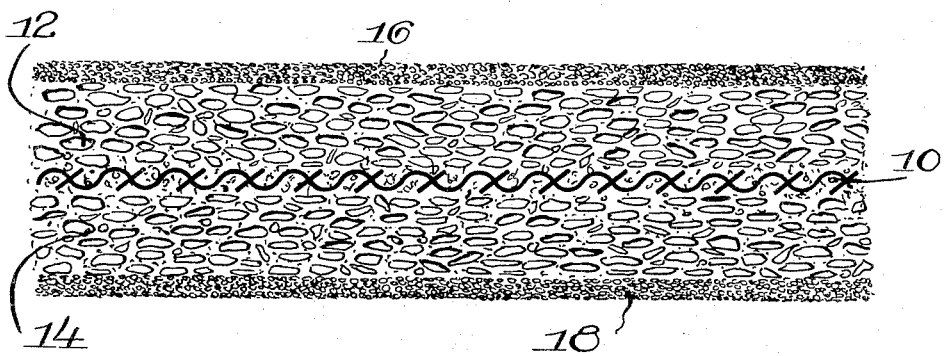
INVENTORS.
George W. Overton
and Binford E. Spencer
Jesch and Darbo Attys.

UNITED STATES PATENT OFFICE 2,540,906

ARTIFICIAL CHAMOIS SKIN AND METHOD OF MAKING THE SAME

George W. Overton and Binford E. Spencer, Freeport, Ill., assignors to Burgess Cellulose Company, Freeport, Ill., a corporation of Delaware Application June 5, 1947, Serial No. 752,856

7 Claims. (Cl. 18—48)

This invention relates to an artificial chamois skin construction and the method of making the same. That is, it relates to a thin, flexible, water-absorbent sheet material which may be used as a substitute for natural chamois skin and which possesses the properties and advantages of a natural chamois skin, and the method of manufacturing such a product. The product is composed of a porous sheet of cellulose, generally similar in character to the material which is known as artificial sponge or cellulose sponge.

It is the object of the invention to provide an artificial chamois skin which possesses the properties and advantages of natural chamois skin, such as water absorbency, softness, flexibility and strength. In fact, the product of the invention possesses greater water absorbency than does natural chamois skin, and is in this respect superior to natural chamois skin for many uses.

The principal use of natural chamois skin is in the wiping of moisture from wet surfaces, such as windows which have been washed, or other glass, metal, etc., surfaces. For this use, moisture absorbency is of primary importance, and the product of the present invention has been found to be superior to natural chamois skin.

In accordance with the invention, a mixture of viscose and water soluble salt particles is squeezed between two surfaces to form a thin sheet of the mixture, heat is applied to the mixture while it is between the surfaces to regenerate the cellulose, and the resulting sheet of regenerated cellulose is removed from between the surfaces and washed with water to dissolve out the salt. The result is a flexible porous sheet of regenerated cellulose having substantially the properties of natural chamois skin.

The process of converting the mixture of viscose and particles into a porous cellulose product follows the process which has been known heretofore for the making of artificial sponge and any such process may be used, as is exemplified by the process described in U. S. Patents Nos. 1,142,619 and 1,611,056.

The following is an example of a suitable process. A mixture is made having the following composition:

400 grams of viscose containing 36 grams of cellulose, which has been aged for approximately 20 hours;
18 grams of comminuted hemp fibers;
2000 grams of Glauber's salt ($Na_2SO_4.10H_2O$) of a particle size such that more than 50% by weight passes through a 12 mesh per inch sieve, Tyler standard.

The mass is agitated until a thorough intimate mixture is obtained, which requires ten or fifteen minutes.

A doughy, plastic, viscous, cohesive mass results, which is then squeezed under pressure between two plates having corrosion resistant surfaces, such as glass, stainless steel, chromium plated metal, or the like. This may be done by spreading or depositing a quantity of the mass upon one of the plates and bringing the other plate into the desired proximity to the first. The mass is spread to a thickness greater than the distance apart of the plates, whereby the mass is squeezed out into a layer of the desired thickness. The sheet undergoes shrinkage during the subsequent drying, and the shrinkage in thickness may be as much as 50%. The plates are spaced apart a distance greater than the desired thickness of the final dry sheet to allow for the shrinkage. While the thickness of the final dry sheet may vary from approximately $\frac{1}{32}$ inch to approximately $\frac{1}{4}$ inch, the preferred thickness is approximately $\frac{1}{16}$ to $\frac{1}{8}$ inch. The mass is not confined or restricted against escape from between the plates. Its viscosity is such that sufficient pressure is exerted upon it by the plates to produce uniform thickness and the desired surface characteristics in the final product, as will be described hereinafter. The density of the resulting sheet is satisfactory. However, restriction against escape may be interposed, if desired, to obtain a predetermined density.

The mixture between the plates is then heated to regenerate the cellulose. Any suitable temperature may be employed, and 100° C. has been found to be satisfactory. Heating may be accomplished by placing the apparatus in an oven under conditions such that the mass does not dry out, or submerging it in heated or boiling water or an aqueous solution of Glauber's salt, or the sheet forming plates may be steam heated platens. At the 100° C. temperature, the regeneration is complete after approximately two hours of heating. The heating may then be discontinued, and the sheet of regenerated cellulose is removed from between the plates. The Glauber's salt is then dissolved out of the sheet by washing the same with water.

After the salt has been thoroughly washed out, the wet sheet is subjected to an initial drying operation. If desired, it may be given a prior treatment with an emollient, such as glycerine or a glycol. It is preferably supported during drying in such manner that shrinkage along the plane of the sheet is prevented or retarded. There is a natural tendency to shrink and such type of support causes it to be under tension while it is drying. As a result, the surfaces of the dried sheet are relatively smooth and free of wrinkles. The sheet retains this characteristic of smoothness thereafter regardless of the number of times that it is rewet and dried. Drying under tension also results in the sheet being of substantially uniform thickness throughout its area, whereas ordinary drying results in some non-uniformity of thickness. If these characteristics are of no importance, the sheet may be dried without being kept under tension.

The resulting product is a sheet of porous regenerated cellulose or cellulose sponge. The sheet has a skin at the surfaces thereof which is more dense than the body of the sheet. The surface skin is apparently formed by a rearrangement which occurs in the plastic mass while it is being pressed into the shape of a sheet between the plates, prior to regeneration of the cellulose, which rearrangement results in a densification at the surfaces. Any working of the surface of the plastic mass prior to regeneration increases the densifying effect. Such increase may be accomplished by causing relative motion between the plates and the surface of the mass in the plane of said surface. The sheet, even though it may be as thin as $\frac{1}{32}$ of an inch, is composed of a core portion located between a pair of surface skins, the skins being considerably more dense than the core. The surface skins, however, are by no means impervious, but are actually extremely porous, such that water is rapidly absorbed and easily squeezed or wrung out again. In this respect, the water is absorbed and squeezed out more rapidly than with a natural chamois skin. In addition, the amount of water which is absorbed is exceptionally great. Sheets have been used which absorb as much as 14 times the dry weight of the sheet. The wet sheet is soft, flexible and elastic and yet possesses surprising strength and toughness. Its tensile strength and toughness are such that it withstands for a long period of time the rigorous rubbing, squeezing and wringing involved in its use in cleaning and polishing service. Also, when wet it does not have the slimy feel and slipperyness of a natural chamois skin. It is highly effective for polishing service because it is completely free of lint. During wetting and drying it expands and contracts in thickness, but undergoes little or no change in length or width. The dry strength is also surprisingly great, and when it is dried after having been wet, it does not have the board-like hardness and stiffness of natural chamois skin, but is softer and more flexible.

The strength of the artificial chamois skin of this invention can be increased by embedding in it a reinforcing textile fabric. Any flexible textile fabric may be used, preferably open mesh, such as cheese cloth, mosquito netting, or the like. The fabric may be embedded substantially midway between the surfaces of the sheet, or two sheets of the fabric may be employed, one at each surface of the artificial chamois skin. Taking the first form as an example, it may be constructed by placing the fabric upon a sheet forming plate, such as described heretofore, and spreading a layer of the viscous mixture upon the fabric, bringing a second plate down upon the spread mixture and squeezing the latter down to the desired thickness. The entire arrangement is then turned upside down and the top plate (formerly the bottom plate) removed to expose the fabric. Another layer of the mixture is spread upon the exposed surface of the fabric. The top plate is then replaced upon the spread layer and the plates are brought into the required proximity to form a composite sheet of the desired thickness. The mixture between the plates is then subjected to the same steps described heretofore, namely, heating to regenerate the cellulose, removal from between the plates, washing to dissolve away the salts, and drying under tension to form a smooth surfaced, laminated or reinforced, artificial chamois skin.

The laminated sheet structure is illustrated in the single figure of the drawing in which the reinforcing fabric is shown at 10, embedded in the porous regenerated cellulose substantially midway between the surfaces thereof such as to form layers 12 and 14 of said cellulose on either side of the fabric, said layers being of substantially equal thickness. The layer 12 has the dense surface skin 16 and the layer 14 has the skin 18.

While but a single example is given of a composition for making the artificial chamois skin, many variations therefrom may be made within the scope of the invention. For example, the viscose may contain a different percentage of cellulose from that given, namely from approximately 5% to approximately 20%. Also, the viscose may be aged more or less than the twenty hours mentioned, and it may be freshly made. The primary desideratum is for the plastic mixture to have a viscosity such that it flows smoothly under the pressure of the sheet forming surfaces and still will hold a given shape. Also, the proportion of the fibers may be varied. The strength of the sheet is increased as the proportion of fibers is increased, and vice versa. On the other hand, the pliability of the sheet in the wet state decreases as the fiber content increases. Also, fibers other than hemp may be used, such as cotton, flax, ramie, jute, etc. Also, the proportion of salt particles may be varied. The porosity decreases as the proportion of salt is decreased, and vice versa. The strength of the sheet, on the other hand, increases as the proportion of the crystals is decreased.

The size of the salt particles may be varied, but it is preferred that the particle size does not exceed that which will pass through an 8 mesh per inch sieve. The pores formed by the particles are smaller than the particles themselves, and, therefore, do not exceed .094 inch in their greatest dimension. A few percent of the pores may exceed this size, but the great majority does not. It is preferred that at least 50% of the weight of the particles be of a size which will pass through a 12 mesh per inch sieve. The resulting sheet is, therefore, of relatively fine pored character. None of the crystals should be of a size large enough that they are crushed by the plates when they are brought together to form the sheet.

As an alternative procedure for the formation of the thin sheet of artificial chamois skin, the viscous mixture described heretofore may be extruded from between two heated plates in a continuous operation, such that the heat for regeneration is applied while it is passing between the plates. A moving supporting member may be provided to carry away the sheet as it emerges from between the plates. In this procedure, the relative motion between the sheet and the plates produces a relatively high degree of densification at the surfaces of the sheet, with the result that there is a pronounced skin effect.

While the sheet-forming plates have been described as being flat, they may be of any other shape, as may be desired.

What is claimed is:

1. An integral sheet of porous regenerated cellulose having a thickness of from approximately $\frac{1}{32}$ inch to approximately $\frac{1}{4}$ inch, said sheet having at each of the broad surfaces thereof a skin which is more dense than the interior of the sheet.

2. A sheet of porous regenerated cellulose as claimed in claim 1, in which the pores do not substantially exceed 0.094 inch in their greatest dimension.

3. A sheet of porous regenerated cellulose as claimed in claim 1, in which a flexible fabric of strands is embedded between the surfaces thereof.

4. A sheet of porous regenerated cellulose as claimed in claim 1, in which the surfaces of the sheet are substantially unwrinkled.

5. The method of making a sheet of porous regenerated cellulose in which the pores do not substantially exceed 0.094 inch in their greatest dimension which comprises placing under pressure between two broad surfaced members spaced apart approximately $\frac{1}{16}$ inch to $\frac{1}{2}$ inch a plastic paste composed of a mixture comprising viscose and particles of a water soluble salt of a size which will pass through an 8 mesh per inch sieve, regenerating cellulose from said viscose, removing the resulting sheet from between said surfaces and dissolving said particles by washing said sheet with water to form an integral porous regenerated cellulose sheet having at each of the broad surfaces thereof a skin which is more dense than is the interior of the sheet.

6. The method of making a porous regenerated cellulose sheet which comprises placing a plastic paste composed of a mixture comprising viscose, fibers and particles of a water soluble salt under pressure between two broad surfaced members spaced apart approximately $\frac{1}{16}$ inch to $\frac{1}{2}$ inch, regenerating cellulose from said viscose, removing the resulting sheet from between said members, washing said sheet with water to remove said salt particles and form an integral porous regenerated cellulose sheet having at each of the broad surfaces thereof a skin which is more dense than is the interior of the sheet, and drying said washed sheet.

7. The method as claimed in claim 6 in which the sheet is maintained under tension during drying.

GEORGE W. OVERTON.
BINFORD E. SPENCER.

REFERENCES CITED

The following references are of record in the file of this patent:

UNITED STATES PATENTS

| Number    | Name          | Date           |
|-----------|---------------|----------------|
| 1,496,500 | Turner        | June 3, 1924   |
| 1,924,635 | Buffington    | Aug. 29, 1933  |
| 1,977,874 | Denning       | Oct. 23, 1934  |
| 2,133,805 | Brown         | Oct. 18, 1938  |
| 2,157,243 | Minor         | May 9, 1939    |
| 2,295,823 | Banigan et al.| Sept. 15, 1942 |
| 2,298,074 | Straub        | Oct. 6, 1942   |